US011021333B2

(12) United States Patent
Shimamura et al.

(10) Patent No.: US 11,021,333 B2
(45) Date of Patent: Jun. 1, 2021

(54) CONVEYOR TRACKING SYSTEM AND CALIBRATION METHOD

(71) Applicant: OMRON Corporation, Kyoto (JP)

(72) Inventors: Junji Shimamura, Takatsuki (JP); Yosuke Iwai, Kusatsu (JP); Akiro Kobayashi, Kusatsu (JP); Taku Oya, Kyoto (JP)

(73) Assignee: OMRON Corporation, Kyoto (JP)

( * ) Notice: Subject to any disclaimer, the term of this patent is extended or adjusted under 35 U.S.C. 154(b) by 238 days.

(21) Appl. No.: 16/188,281

(22) Filed: Nov. 13, 2018

(65) Prior Publication Data

US 2019/0256300 A1 Aug. 22, 2019

(30) Foreign Application Priority Data

Feb. 16, 2018 (JP) .............................. JP2018-026357

(51) Int. Cl.
*B65G 47/90* (2006.01)
*B25J 9/00* (2006.01)
(Continued)

(52) U.S. Cl.
CPC .......... *B65G 47/905* (2013.01); *B25J 9/0093* (2013.01); *B25J 9/1692* (2013.01); *B25J 9/1697* (2013.01);
(Continued)

(58) Field of Classification Search
CPC .......... G05B 2219/40007; G05B 2219/45063; G05B 2219/40012; G05B 19/401;
(Continued)

(56) References Cited

U.S. PATENT DOCUMENTS 9,102,055 B1 8/2015 Konolige et al.
2012/0323363 A1* 12/2012 Izumi ................. G05B 19/4182
700/248

(Continued)

FOREIGN PATENT DOCUMENTS

EP 1875991 1/2008
EP 2497611 9/2012
(Continued)

OTHER PUBLICATIONS

"Search Report of Europe Counterpart Application", dated May 13, 2019, p. 1-p. 8.

(Continued)

*Primary Examiner* — Adam R Mott
*Assistant Examiner* — Arslan Azhar
(74) *Attorney, Agent, or Firm* — JCIPRNET

(57) ABSTRACT

A method for allowing even a user with little experience in robot operation to be able to perform correct calibration is provided. A mobile device displays one or more patterns at predetermined positions and transmits information indicating a touch position to a control device according to touching applied to the touch position in a state that the patterns are displayed. The control device calculates a parameter set based on an image measurement result obtained by a visual sensor when the mobile device is disposed in an image visual field in a state that the patterns are displayed, a touch position when the mobile device is touched by a robot, and a distance between a position of the mobile device when disposed in the imaging visual field and a position when the mobile device is touched by the robot.

9 Claims, 12 Drawing Sheets

(51) Int. Cl.
    *B25J 9/16* (2006.01)
    *B65G 43/00* (2006.01)

(52) U.S. Cl.
    CPC ........ *B65G 43/00* (2013.01); *B65G 2203/044* (2013.01)

(58) Field of Classification Search
    CPC ...... B23J 9/1653; B25J 9/1669; B25J 9/0093; B25J 9/1692; B25J 9/1697; B25J 9/1628; B25J 9/1635; B25J 9/1653; B23P 19/007; B65G 47/91; B65G 47/90; B65G 47/905; B65G 43/00; B65G 2203/044
    USPC ........................................................ 700/254
    See application file for complete search history.

(56)     References Cited

U.S. PATENT DOCUMENTS

2013/0329954 A1* 12/2013 Ikeda ................ B23Q 17/2414
                                                                382/103
2018/0126557 A1* 5/2018 Gu .................... G05B 19/4015

FOREIGN PATENT DOCUMENTS

| | | |
|---|---|---|
| EP | 2993002 | 3/2016 |
| EP | 3171236 | 5/2017 |
| JP | 2001071288 | 3/2001 |
| JP | 2008012604 | 1/2008 |
| JP | 2009290852 | 12/2009 |
| JP | 2012166308 | 9/2012 |
| JP | 2012187651 | 10/2012 |
| JP | 2012192466 | 10/2012 |
| JP | 2013000860 | 1/2013 |
| JP | 2015174171 | 10/2015 |
| JP | 2016209995 | 12/2016 |

OTHER PUBLICATIONS

"Office Action of Japan Counterpart Application", dated Jan. 5, 2021, with English translation thereof, pp. 1-9.

* cited by examiner

CAMERA COORDINATE SYSTEM → ROBOT COORDINATE SYSTEM

CONVEYOR TRACKING SYSTEM AND CALIBRATION METHOD

CROSS-REFERENCE TO RELATED APPLICATION

This application claims the priority of Japan patent application serial no. 2018-026357, filed on Feb. 16, 2018. The entirety of the above-mentioned patent application is hereby incorporated by reference herein and made a part of this specification.

BACKGROUND

Technical Field

The disclosure relates to calibration in a conveyor tracking system.

Description of Related Art

In the factory automation (FA) field, technology for controlling various processes using image processing is frequently used for labor saving. As an application example of such image processing technology, there is an operation process of conveying workpieces according to a conveyance device such as a conveyor belt and tracking and picking up workpieces being conveyed using a robot. Such an operation process is called conveyor tracking and the like.

In this conveyor tracking technology, the position of each workpiece is identified by capturing images of workpieces on a conveyance device using a camera and performing image analysis such as pattern matching or binarization processing on the images obtained according to image capturing. Then, a robot tracks and picks up each workpiece on the basis of the identified position of each workpiece using an image processing device.

Conventionally, the position of a workpiece identified according to image analysis performed on a camera image is coordinate values of a coordinate system based on camera images (hereinafter referred to as "camera coordinate system") and cannot be used for robot control as it is. Accordingly, it is necessary to perform a process of transforming coordinate values calculated in the camera coordinate system into coordinate values on a coordinate system for robot control (hereinafter referred to as "robot coordinate system").

A relationship in which such coordinate values of the camera coordinate system are correlated to coordinate values of the robot coordinate system is determined according to an operation called calibration. For example, Japanese Laid-open No. 2012-187651 (Patent Document 1) discloses a method for calculating parameters set for transforming coordinate values within an imaging range of an imaging unit into coordinate values of a coordinate system of a moving machine using a sheet including a pattern for calibration.

In the method disclosed in Patent Document 1, it is necessary to correctly locate the tip of a hand of a robot on the pattern for calibration. To correctly locate the tip of a hand of a robot on the pattern, a certain degree of experience is required. The position of the tip of the hand of the robot may be measured by imaging the position with a camera using a technology as disclosed in Japanese Laid-open No. 2009-290852 (Patent Document 2), for example, such that users with little experience are also able to perform correct calibration.

However, providing a new camera for calibration is not practical and calibration of a newly provided camera itself is also required.

Accordingly, the disclosure provides a method for allowing even users with little experience in operation of robots to be able to perform correct calibration.

SUMMARY

According to one embodiment of the disclosure, a conveyor tracking system is provided. The conveyor tracking system includes a conveyance device that conveys workpieces; a robot that is disposed in association with the conveyance device and picks up the workpieces conveyed by the conveyance device; an image capturing part that has an imaging visual field on a conveyance route of the conveyance device; a visual sensor that performs an image measurement on images captured by the image capturing part; a control device that generates an operation command for the robot using a parameter set that is previously calculated based on an image measurement result obtained by the visual sensor; and a mobile device which has a touch panel used for a process of calculating the parameter set. The mobile device includes a display part which displays one or more patterns at predetermined positions; and a transmission part which transmits, according to a fact of being touched in a state in which the one or more patterns are displayed, information indicating a touch position being touched to the control device. The control device includes a calculation part which calculates that parameter set based on the image measurement result obtained by the visual sensor when the mobile device is disposed in the imaging visual field in a state in which the one or more patterns are displayed, the touch position when the mobile device is touched by the robot, and a distance between a position of the mobile device when the mobile device is disposed in the imaging visual field and a position when the mobile device is touched by the robot.

DESCRIPTION OF THE EMBODIMENTS

Embodiments of the present disclosure will be described in detail with reference to the drawings. Meanwhile, the same or corresponding parts in the figures are denoted by the same reference signs and description thereof will not be repeated.

<A. Example of Application>

First, an example of a situation to which the present disclosure is applied will be described with reference to FIGS. 1 and 2.

Figure 1:
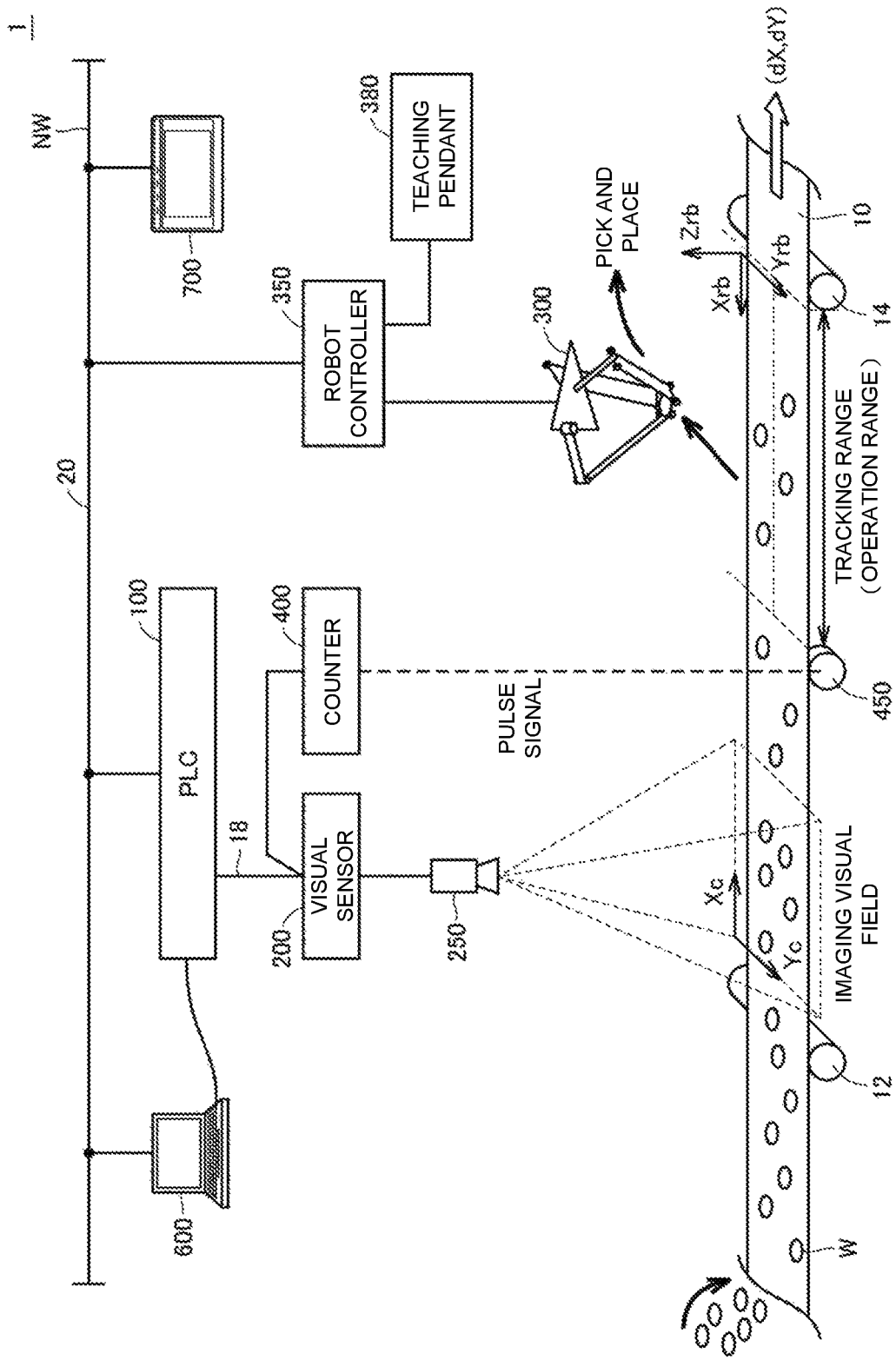
FIG. 1 is a schematic diagram showing the overall configuration of a conveyor tracking system according to the present embodiment.

FIG. 1 is a schematic diagram showing the overall configuration of a conveyor tracking system 1 according to the present embodiment. Referring to FIG. 1, the conveyor tracking system 1 includes a conveyor 10 which is an example of a conveyance device for conveying workpieces W. The conveyor 10 is driven and rotated by driving rollers 12 and 14 to sequentially convey workpieces W supplied at any timing from the left to the right on the paper.

A robot 300 disposed near the conveyor 10 picks up the workpieces W on the conveyor 10 and places the workpieces W on a different line which is not shown, or the like (a pickup and place operation). The robot 300 is disposed in association with the conveyor 10 and picks up the workpieces W conveyed by the conveyor 10. The robot 300 may align an orientation of the workpieces W in a previously designated direction when picking up the workpieces W. Typically, foods such as candy, various tablets and the like may be conceived as the workpieces W.

A camera 250 which is an imaging part having an imaging visual field is disposed on a conveyance route of the conveyor 10. The imaging visual field of the camera 250 is set at the upstream side of the conveyor 10. Images captured by the camera 250 are output to a visual sensor 200. Although FIG. 1 shows a configuration example in which the visual sensor 200 and the camera 250 are independent of each other, a configuration in which both are integrated may be employed.

The visual sensor 200 performs image measurement on images captured by the camera 250. In the present embodiment, the visual sensor 200 measures the position (more specifically, the position of a center of gravity) of each workpiece W on the conveyor 10 by performing an image measurement process such as pattern matching on images sequentially captured by the camera 250.

An encoder 450 is provided in the conveyer 10 and outputs pulse signals according to a movement amount of the conveyor 10. The pulse signals from the encoder 450 are received by a counter 400 and a value indicating the movement amount of the conveyor 10 and/or a value indicating a movement speed are calculated.

A programmable logic controller (PLC) 100 which is an example of a control device is in charge of processes in the conveyor tracking system 1. The PLC 100 is connected to the visual sensor 200 and the counter 400 through a field network 18.

The PLC 100 generates an operation command for the robot 300 using a parameter set calculated in advance based on an image measurement result obtained by the visual sensor 200. More specifically, the PLC 100 acquires the position of each workpiece W measured by the visual sensor 200 and a value indicating a movement amount of the conveyor 10 (and/or a value indicating a movement speed) calculated by the counter 400. The PLC 100 appropriately updates the position of each workpiece W present on the conveyor 10 according to movement of the conveyor 10 and outputs an operation command for the robot 300 on the basis of the updated position of each workpiece W.

The robot 300 picks up a workpiece W which is a target on the conveyor 10 according to an operation command from the PLC 100 and moves and places the workpiece W at a designated position. Although FIG. 1 illustrates a parallel robot as a typical example, the robot is not limited thereto and a scalar robot, a vertical articulated robot and the like may be used.

A robot controller 350 receives an operation command from the PLC 100 and drives each axis constituting the robot 300 according to the received operation command. The robot controller 350 is connected to the PLC 100 through an information system network 20.

A teaching pendant 380 for manually operating the robot 300 is connected to the robot controller 350. When a user operates the teaching pendant 380, the robot 300 operates according to the operation (teaching) of the user.

A human machine interface (HMI) 700 may be connected to the information system network 20 in addition to the PLC 100 and the robot controller 350. The HMI 700 presents information managed by the PLC 100 and the like to the user, and receives an operation from the user and outputs the operation to the PLC 100.

A support device 600 for performing source code editing, object code conversion, debugging and the like with respect to a user program executed in the PLC 100 is connectable to the PLC 100.

As shown in FIG. 1, a coordinate system (hereinafter referred to as a "camera coordinate system") based on the imaging visual field of the camera 250 is defined in the conveyor tracking system 1. The camera coordinate system may be regarded as a two-dimensional coordinate system having an apex of an image captured by the camera 250 as a base. In the example shown in FIG. 1, a coordinate system with an Xc axis and a Yc axis having the left top of an image as a base is designated. That is, when the position of a workpiece W is measured according to pattern matching or the like for images output by imaging the imaging visual field through the camera 250, the measured position of the workpiece W is output as coordinate values of the camera coordinate system (coordinate system with the Xc axis and the Yc axis).

In addition, in the conveyor tracking system 1, a coordinate system (hereinafter referred to as a "robot coordinate system") for designating the position of the tip of the hand (picking) position of the robot 300 is defined. In the example shown in FIG. 1, an Xrb axis and a Yrb axis are defined along a surface parallel with a conveying surface of the conveyor 10. It is assumed that the Xrb axis is parallel with the conveying direction of the conveyor 10 and the Yrb axis is perpendicular to the conveying direction of the conveyor 10. Further, a Zrb axis is defined in a direction perpendicular to the conveying surface of the conveyor 10. Accordingly, the robot coordinate system is configured by three axes including the Xrb axis, the Yrb axis and the Zrb axis. However, since the Xc axis and the Yc axis constituting the camera coordinate system are also parallel with the conveying surface of the conveyor 10, it is possible that the calibration between the camera coordinate system and the robot coordinate system focuses on only the relationship between the Xc axis and the Yc axis of the camera coordinate system and the Xrb axis and the Yrb axis of the robot coordinate system.

Calibration according to the present embodiment includes determination of a parameter set for realizing transformation between coordinate values of the camera coordinate system and coordinate values of the robot coordinate system.

Figure 2:
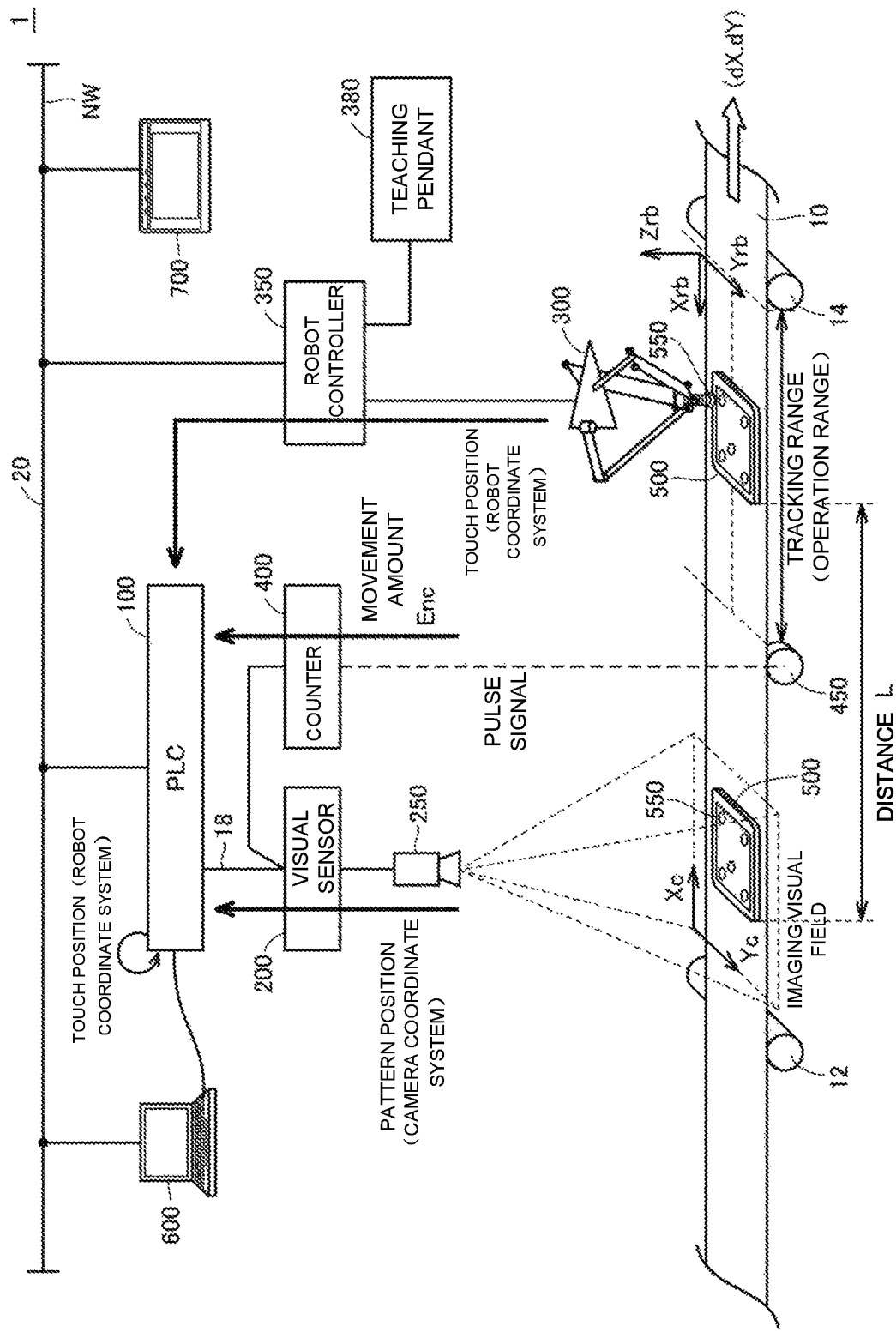
FIG. 2 is a diagram for describing an example of a calibration process in the conveyor tracking system according to the present embodiment.

FIG. 2 is a diagram for describing an example of a calibration process in the conveyor tracking system 1 according to the present embodiment. Referring to FIG. 2, in the present embodiment, the calibration is implemented using a mobile device 500 having a touch panel. The mobile device 500 has the touch panel and calculates a parameter set using a detection result obtained by the touch panel, and the like. As the mobile device 500, for example, a tablet, a notebook computer, a smartphone and the like are conceivable.

Specifically, one or more patterns 550 for the calibration which have been defined in advance are displayed on the touch panel of the mobile device 500 and the mobile device 500 is disposed in the imaging visual field of the camera 250. In this manner, the mobile device 500 has a function of displaying one or more patterns at predetermined positions.

In this state, the visual sensor 200 measures the positions of the patterns 550 with respect to images captured by the camera 250 and the measured positions (coordinate values of the camera coordinate system) are transmitted to the PLC 100.

In one or some exemplary embodiments, data is exchanged between the mobile device 500 and the PLC 100 through wireless communication. Specifically, an interface for performing wireless communication with the mobile device 500 may be provided in the PLC 100. Alternatively, an interface for performing wireless communication with the mobile device 500 may be provided in the field network 18 or the information system network 20 and the PLC 100 may exchange data with the mobile device 500 through the interface.

Subsequently, the mobile device 500 moves on the conveyer 10 to the downstream side by a predetermined distance L. Here, the patterns 550 for the calibration displayed on the touch panel of the mobile device 500 are maintained to be uniform. Then, the user locates the tip of the hand of the robot 300 on each pattern 550 displayed on the touch panel of the mobile device 500 by operating the robot 300.

Here, the mobile device 500 may detect a position at which the tip of the hand of the robot 300 is located on the touch panel. The mobile device 500 transmits the position (coordinate values of the robot coordinate system) on the touch panel at which the tip of the hand of the robot 300 is located to the PLC 100. In this manner, the mobile device 500 has a function of transmitting information representing a touch position to the PLC 100 according to touching applied to the touch position in a state in which one or more patterns 550 have been displayed.

The PLC 100 may acquire a distance L by which the conveyor 10 has moved (or a count number corresponding to the distance L) through the encoder 450 and the counter 400.

The PLC 100 determines a parameter set with respect to the calibration using the positions (coordinate values of the camera coordinate system) of the patterns 550, the distance L by which the mobile device 500 has moved, and the position (coordinate values of the robot coordinate system) of the tip of the hand detected by the mobile device 500.

In this manner, the PLC 100 calculates a parameter set based on an image measurement result obtained by the visual sensor 200 when the mobile device 500 is disposed in the imaging visual field in a state in which one or a plurality of patterns has been displayed, a touch position when the mobile device 500 is touched by the robot 300, and the distance L between the position of the mobile device 500 in the state in which the mobile device 500 is disposed in the imaging visual field and the position when the mobile device 500 is touched by the robot 300.

As will be described later, capturing an image of the mobile device 500 by the camera 250 and touching the mobile device 500 by the robot 300 may be implemented in any order. In the following description, an example of implementing capturing of an image of the mobile device 500 in advance and an example of touching the mobile device 500 in advance by the robot 300 will be respectively described.

In the present embodiment, the PLC 100 performs determination of a parameter set for transforming a measurement result (coordinate values) of the camera coordinate system into the robot coordinate system and arithmetic operations for coordinate transformation between the camera coordinate system and the robot coordinate system using the parameter set. By employing this configuration, arithmetic operations necessary for conveyor tracking may be executed at once in the PLC 100.

<B. Hardware Configuration>

Next, a hardware configuration of each device constituting the conveyor tracking system 1 according to the present embodiment will be described.

(b1: PLC 100)

Figure 3:
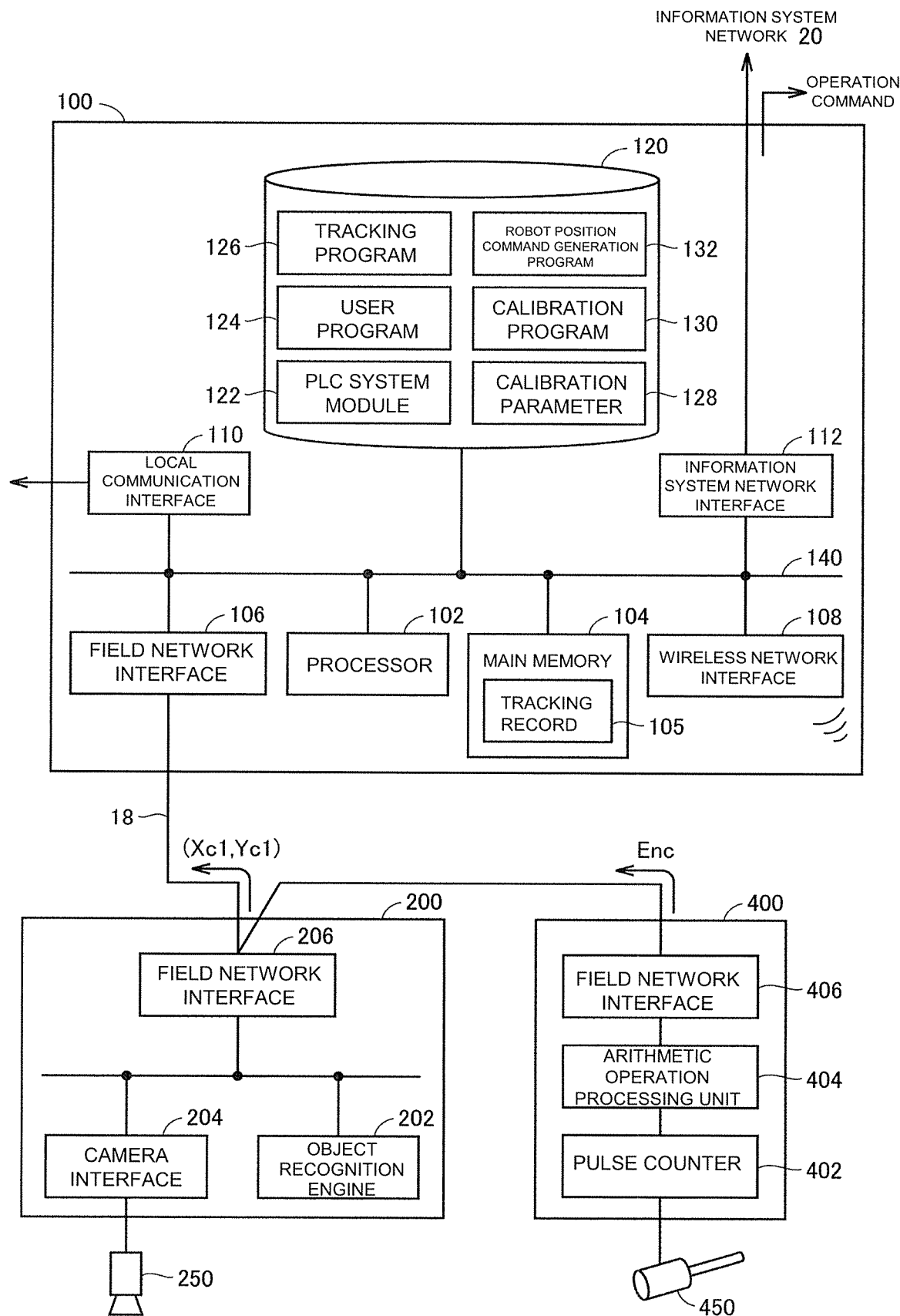
FIG. 3 is a schematic diagram showing an example of a hardware configuration of a device for identifying a position of a workpiece included in the conveyor tracking system according to the present embodiment.

FIG. 3 is a schematic diagram showing an example of a hardware configuration of a device for identifying a position of a workpiece W included in the conveyor tracking system 1 according to the present embodiment. Referring to FIG. 3, the PLC 100 is a kind of computer and realizes various processes by executing various programs through a processor.

The PLC 100 includes a processor 102, a main memory 104, a field network interface 106, a wireless network interface 108, a local communication interface 110, an information system network interface 112, and a storage 120. These components are connected to a bus 140.

The processor 102 reads programs stored in the storage 120 and the like to the main memory 104 and executes the programs. For example, the processor 102 may be composed of a central processing unit (CPU), a micro-processing unit (MPU), a graphics processing unit (GPU) or the like. For the processor 102, a configuration having a plurality of cores may be employed or a plurality of processors 102 may be provided.

The main memory 104 is composed of a volatile storage device such as a dynamic random access memory (DRAM) and a static random access memory (SRAM), and the like.

The field network interface 106 is a controller which exchanges data with the visual sensor 200 and the counter 400 through the field network 18. For example, it is possible to employ a fixed-cycle network such as EtherCAT (registered trademark) as the field network 18.

The wireless network interface 108 is a controller which exchanges data with the mobile device 500 through wireless communication. For example, a wireless local area network (LAN), Bluetooth (registered trademark) or the like which conforms to IEEE 802.11 may be used as wireless communication.

The local communication interface 110 is a controller which exchanges data with the support device 600 and the like. For example, a universal serial bus (USB) and the like may be used for local communication.

The information system network interface 112 is a controller which exchanges data with the robot controller 350, the HMI 700 and the like through the information system network 20. For example, the Ethernet (registered trademark) and EtherNet/IP (registered trademark) which are general network protocols, and the like may be used for the information system network 20.

The storage 120 stores programs executed in the PLC 100 and various types of data in a nonvolatile manner. For example, the storage 120 may be composed of a nonvolatile storage device such as a flash memory and a hard disk.

In the configuration shown in FIG. 3, the storage 120 includes a PLC system module 122, a user program 124, a tracking program 126, calibration parameters 128, a calibration program 130 and a robot position command generation program 132.

The PLC system module 122 includes a library and the like and provides a basic control function realized according to execution of the user program 124. The user program 124 is a program arbitrarily created according to a control target of the PLC 100 and includes a sequence program, a motion program and the like.

The tracking program 126 includes code for realizing a process of sequentially updating positions of workpieces W for realizing conveyor tracking. When the tracking program 126 is executed, a tracking record 105 which manages the position of each workpiece W is generated in the main memory 104. The calibration parameters 128 are a parameter set with respect to the calibration, which are determined according to a procedure which will be described later. The calibration program 130 includes code for realizing the procedure which will be described later. The robot position command generation program 132 generates commands necessary for the robot 300 (e.g., a workpiece following speed, a pickup operation start position, a movement destination of workpieces W, and the like) on the basis of the position of each of workpiece W managed by executing the tracking program 126.

Although FIG. 3 shows an example of a configuration in which the processor 102 executes programs to provide necessary processes, some or all of the provided processes may be mounted using a dedicated hardware circuit (e.g., an application specific integrated circuit (ASIC)) or a field-programmable gate array (FPGA) or the like).

(b2: Visual Sensor 200 and Camera 250)

Referring to FIG. 3, the visual sensor 200 is a kind of computer and measures the position of each workpiece W on the conveyor 10 by performing an image measurement process such as pattern matching on images sequentially captured by the camera 250.

More specifically, the visual sensor 200 includes an object recognition engine 202, a camera interface 204 and a field network interface 206.

The object recognition engine 202 performs an image measurement process such as pattern matching on input images from the camera 250. The object recognition engine 202 outputs coordinate values (Xc1, Yc1) of the camera coordinate system as the position of a recognized workpiece. The camera interface 204 acquires images from the camera 250 and applies various settings for the camera 250. The field network interface 206 is a controller which exchanges data (coordinate values of workpieces Win this example) with the PLC 100 through the field network 18.

The visual sensor 200 may be realized by a processor executing a program and may be mounted using a dedicated hardware circuit (e.g., an ASIC, an FPGA or the like).

The camera 250 includes an optical system such as lenses and an aperture, and a light-receiving element such as a charge coupled device (CCD) image sensor or a complementary metal oxide semiconductor (CMOS) image sensor. The camera 250 captures images according to a command from the visual sensor 200 and outputs the captured images to the visual sensor 200.

(b3: Robot 300 and Robot Controller 350)

Figure 4:
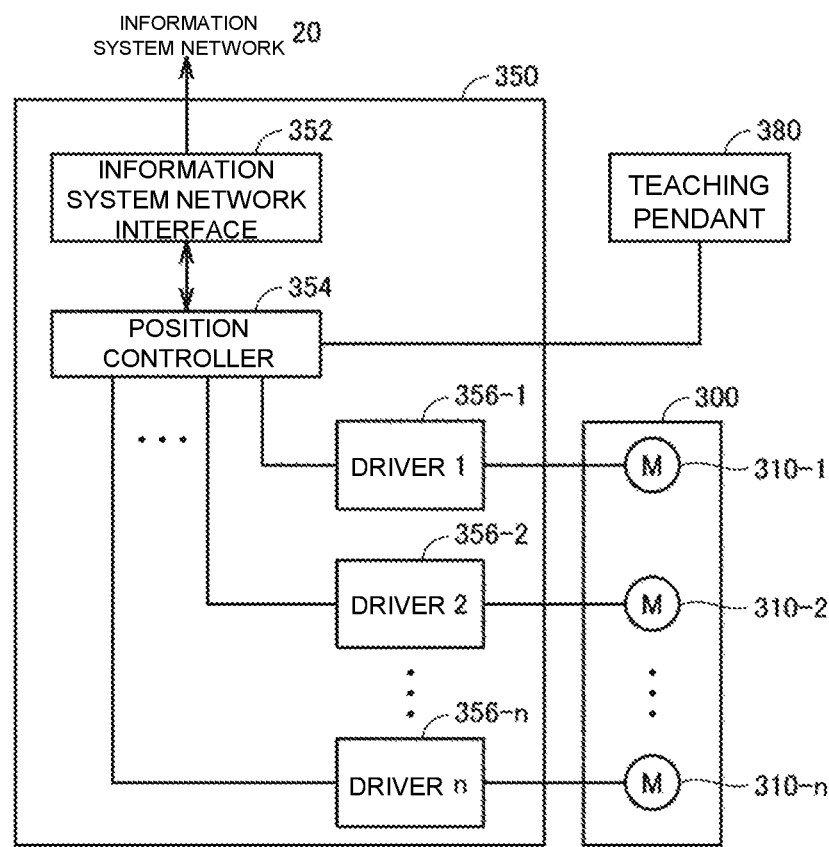
FIG. 4 is a schematic diagram showing an example of a hardware configuration of a device for pickup of a workpiece included in the conveyor tracking system according to the present embodiment.

FIG. 4 is a schematic diagram showing an example of a hardware configuration of a device for pickup of a workpiece W included in the conveyor tracking system 1 according to the present embodiment. Referring to FIG. 4, the robot controller 350 causes the robot 300 to perform designated operations by driving motors 310-1, 310-2, . . . , 310-$n$ constituting the robot 300.

The robot controller 350 includes an information system network interface 352, a position controller 354 and drivers 356-1, 356-2, . . . , 356-$n$.

The information system network interface 352 is a controller which exchanges data (operation commands in this example) with the PLC 100 through the information system network 20. The position controller 354 outputs a position command (e.g., a number of pulses according to a movement amount) for the drivers 356-1, 356-2, . . . , 356-$n$ according to an operation command from the PLC 100. The drivers 356-1, 356-2, . . . , 356-$n$ generates a power signal for driving the motors 310-1, 310-2, . . . , 310-$n$ of the robot 300 according to a command from the position controller 354.

The robot controller 350 may be realized by a processor executing a program or may be mounted using a dedicated hardware circuit (e.g., an ASIC or an FPGA).

(b4: Counter 400 and Encoder 450)

Referring back to FIG. 3, the counter 400 detects a movement amount of a detection target (the conveyor 10 in the present embodiment) of the encoder 450 by counting pulse signals output from the encoder 450.

More specifically, the counter 400 includes a pulse counter 402, an arithmetic operation processing unit 404 and a field network interface 406.

The pulse counter 402 receives input of pulse signals from the encoder 450 and integrates the number of times of generation of rising edges and falling edges of the pulse signals. The arithmetic operation processing unit 404 calculates a movement amount of the detection target (conveyor 10) by multiplying a count number obtained by the pulse counter 402 by a predetermined coefficient. Alternatively, the arithmetic operation processing unit 404 may output a count number obtained by the pulse counter 402 as it is. The field network interface 406 is a controller which exchanges data (a count number in this example) with the PLC 100 through the field network 18.

(b5: Mobile Device 500)

Figure 5:
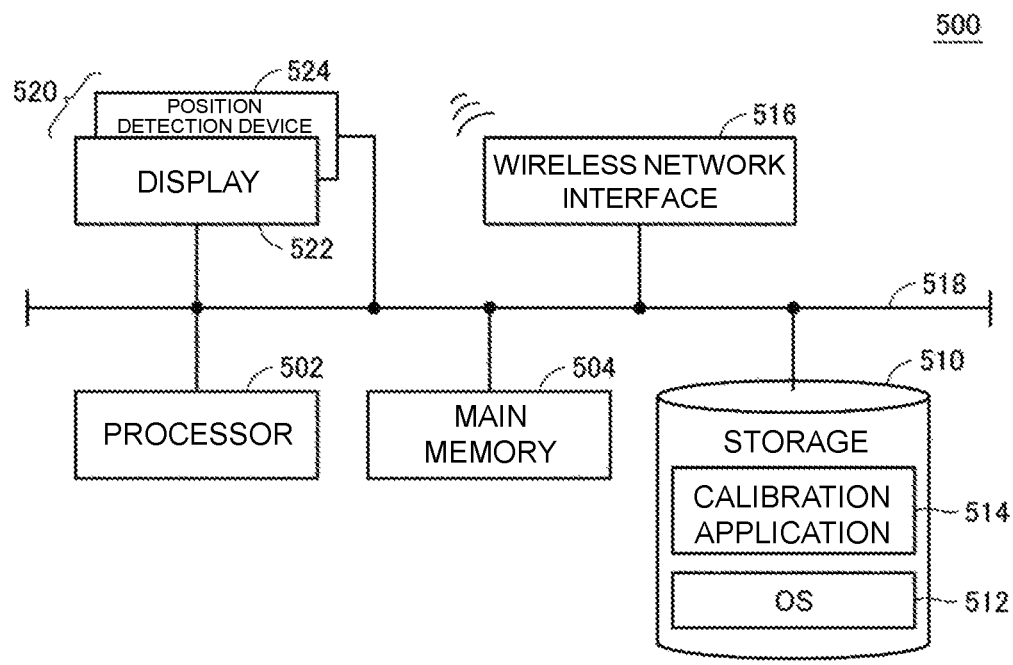
FIG. 5 is a schematic diagram showing an example of a hardware configuration of a mobile device used in the conveyor tracking system according to the present embodiment.

FIG. 5 is a schematic diagram showing an example of a hardware configuration of the mobile device 500 used in the conveyor tracking system 1 according to the present embodiment. Referring to FIG. 5, the mobile device 500 includes a processor 502, a main memory 504, a storage 510, a wireless network interface 516 and a touch panel 520. These components are connected to a bus 518.

The processor 502 reads programs such as an operating system (OS) 512 and a calibration application 514 stored in the storage 510 to the main memory 504 and executes the programs. For example, the processor 502 may be composed of a CPU, an MPU, a GPU or the like. As the processor 502, a configuration having a plurality of cores may be employed or a plurality of processors 502 may be provided. For example, the main memory 504 may be composed of a volatile storage device such as a DRAM and an SRAM. For example, the storage 510 may be composed of a nonvolatile storage device such as a flash memory or a hard disk.

The wireless network interface 516 is a controller which exchanges data with the PLC 100 through wireless communication.

The touch panel 520 receives an external touch operation and detects a position touched according thereto. The touch panel 520 includes a display 522 for displaying various types of information and a position detection device 524 for detecting a touch position. Further, a known device such as a capacitive device, a pressure sensitive device or ultrasonic device may be used as the position detection device 524.

The calibration application 514 realizes processes of displaying patterns for the calibration on the display 522, detecting a position touched by the robot 300 or the like and transmitting the position to the PLC 100, as will be described later.

(b6: Support Device 600)

The support device 600 provides functions such as source code editing, object code conversion and debugging with respect to the user program executed in the PLC 100. Typically, the support device 600 is realized by executing a support program through a general-purpose computer conforming to a known architecture. Since a hardware configuration of the general-purpose computer is known, detailed description thereof is not performed.

(b7: HMI 700)

The HMI 700 presents information managed by the PLC 100 and the like to a user, receives an operation from the user and outputs the operation to the PLC 100. Typically, the HMI device 700 is realized by executing a support program through a general-purpose computer conforming to a known architecture. Since a hardware configuration of the general-purpose computer is known, detailed description thereof is not performed.

<C. Coordinate Transformation and Calibration>

Next, coordinate transformation and calibration therefor in the conveyor tracking system 1 according to the present embodiment will be described.

Figure 6:
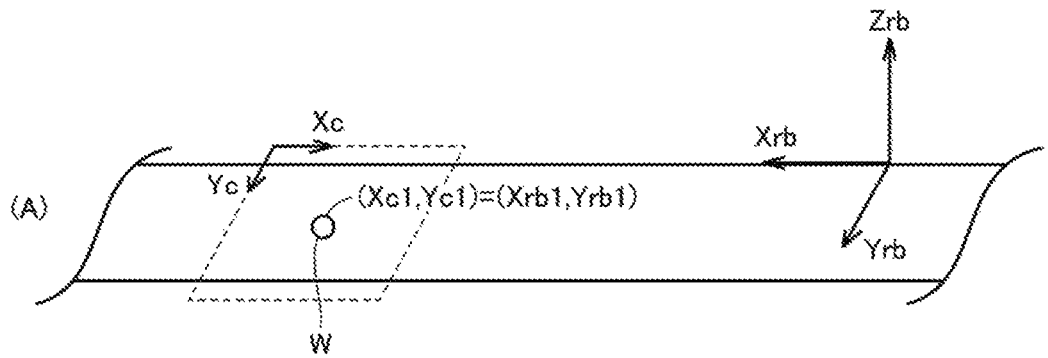
FIG. 6 is a diagram for describing coordinate transformation and tracking in the conveyor tracking system according to the present embodiment.
Figure 6:
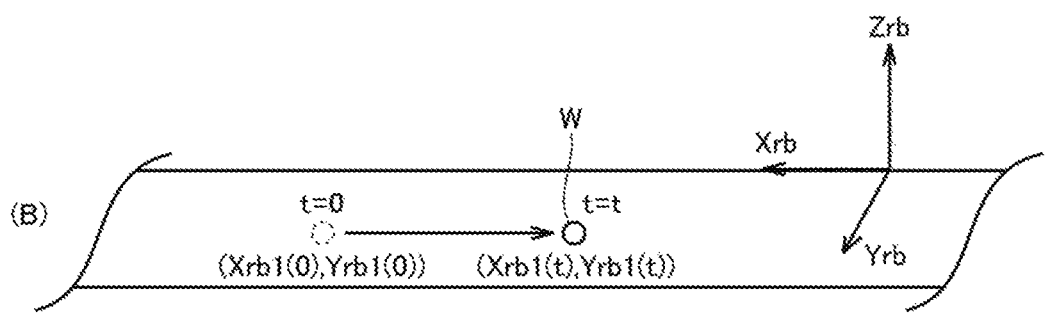

FIGS. 6A and 6B are diagrams for describing coordinate transformation and calibration in the conveyor tracking system 1 according to the present embodiment. Referring to FIG. 6A, it is assumed that the position of a workpiece W is measured in the camera coordinate system (coordinate system with the Xc axis and the Yc axis) set in the imaging visual field of the camera 250. The measured position may be represented as coordinate values (Xc1, Yc1) of the camera coordinate system. A process of representing the coordinate values (Xc1, Yc1) of the camera coordinate system as coordinate values (Xrb1, Yrb1) of the robot coordinate system (coordinate system with the Xrb axis and the Yrb axis) is coordinate transformation. Coordinate transformation according to the present embodiment may also include, in addition to the process of transforming the coordinate values (Xc1, Yc1) of the camera coordinate system into the coordinate values (Xrb1, Yrb1) of the robot coordinate system, a process of inverse transformation thereof.

As an example of coordinate transformation, for example, a transformation formula represented by the following formulas (1-1) and (1-2) may be used.

$$Xrb1 = A \cdot Xc1 + B \cdot Yc1 + C \quad (1\text{-}1)$$

$$Yrb1 = D \cdot Xc1 + E \cdot Yc1 + F \quad (1\text{-}2)$$

In the above formulas, coefficients A, B, C, D, E and F correspond to a parameter set with respect to the calibration.

Meanwhile, a coordinate transformation formula is not limited to the aforementioned transformation formula and any transformation formula may be used. It is assumed that the parameter set with respect to the calibration depends on a used transformation formula.

Referring to FIG. 6B, when the workpiece W is conveyed on the conveyor 10, the position thereof changes by the conveyed distance, and thus the position of the workpiece W at an arbitrary time t may be calculated according to a transformation formula represented by the following formulas (2-1) and (2-2) when a movement amount (movement speed) of the conveyer 10 per unit count number is represented by each component of the camera coordinate system (coordinate system with the Xc axis and the Yc axis) as dX and dY.

$$Xrb1(t) = Xrb1(0) + dX \cdot En_C(t) \quad (2\text{-}1)$$

$$Yrb1(t) = Yrb1(0) + dY \cdot En_C(t) \quad (2\text{-}2)$$

Here, $En_C(t)$ denotes a count number increment from a count number at a timing (time t0) when the position of the workpiece W is measured.

In the conveyor tracking system 1, the PLC 100 saves a count number at a timing when the position of any workpiece W has been measured by the visual sensor 200 as an initial count number of the workpiece W. In addition, the PLC 100 sequentially updates (i.e., tracks) the positions of workpieces W based on a count number increment with respect to each workpiece W.

The PLC 100 outputs an operation command for the robot 300 based on the position of each workpiece W which is sequentially updated according to conveyance of the conveyor 10.

The processes in the conveyor tracking system 1 according to the present embodiment are summarized as follows.

Workpieces W which are conveyance targets are sequentially conveyed from the upstream side of the conveyor 10. When the camera 250 disposed at the upstream side of the conveyor 10 captures images of the workpieces W, the visual sensor 200 measures the positions of the workpieces W (generally the positions of centers of gravity of the workpieces W) which are conveyance targets. The PLC 100 transforms the positions of the workpieces W (coordinate values of the camera coordinate system) measured by the visual sensor 200 into coordinate values of the robot coordinate system, sequentially updates the positions of the respective workpieces W according to a movement amount of the conveyor 10 and gives an operation command to the robot 300.

The robot 300 picks up and conveys workpieces W entering a predetermined tracking range (operation range) in order according to the operation command from the PLC 100.

In the conveyor tracking system 1 according to the present embodiment, the calibration is performed using the mobile device 500 having a touch panel. A calibration procedure and the like will be described below.

<D. Calibration Process (1)>

First, a calibration process (1) will be described. In this calibration process (1), the mobile device 500 is used instead of a sheet including the conventional patterns for the calibration.

(d1: Overview)

Figure 7:
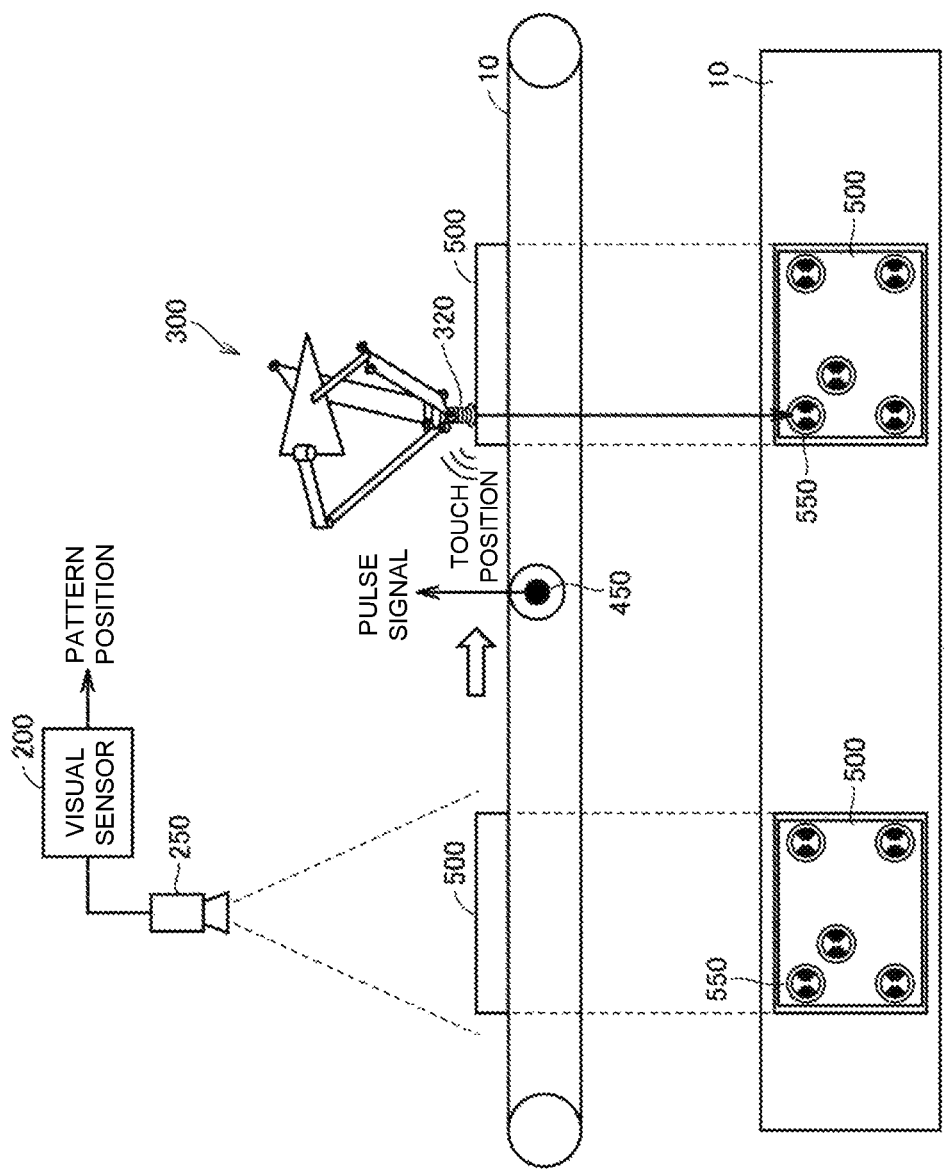
FIG. 7 is a schematic diagram for describing a calibration process (1) according to the present embodiment.
Figure 8:
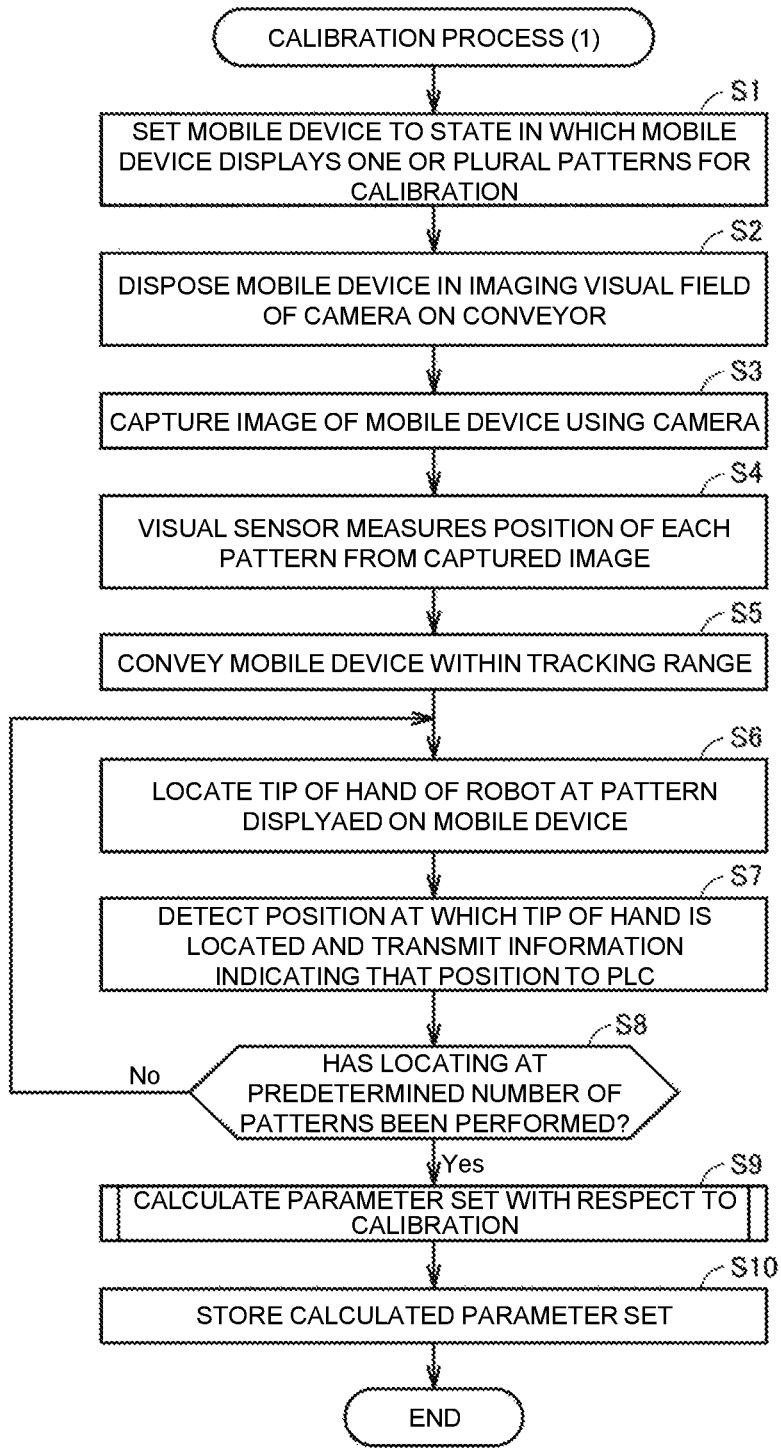
FIG. 8 is a flowchart showing a processing procedure of the calibration process (1) according to the present embodiment.

FIG. 7 is a schematic diagram for describing the calibration process (1) according to the present embodiment. FIG. 8 is a flowchart showing a processing procedure of the calibration process (1) according to the present embodiment.

Referring to FIGS. 7 and 8, first, the mobile device 500 is set to a state in which the mobile device 500 displays one or more patterns 550 for the calibration (step S1), and the mobile device 500 is disposed in the imaging visual field of the camera 250 on the conveyor 10 in this state (step S2).

Subsequently, the camera 250 captures an image of the mobile device 500 displaying the one or more patterns 550 (step S3) and the visual sensor 200 measures the position (e.g., the position of the center or the position of center of gravity) of each pattern 550 by performing pattern matching or the like on the captured image (step S4).

Thereafter, the conveyor 10 is driven to convey the mobile device 500 within a tracking range (the operation range of the robot 300) (step S5). Then, a user locates the tip 320 of the hand of the robot 300 at a pattern 550 displayed on the mobile device 500 using the teaching pendant 380 or the like (step S6). In this manner, the mobile device 500 is disposed in the imaging visual field where an image thereof is captured by the camera 250 and then receives a touch operation performed by the robot 300.

The mobile device 500 detects the position at which the tip 320 of the hand of the robot 300 has been located and transmits information representing the position to the PLC 100 (step S7).

Then, it is determined whether locating at a predetermined number of patterns 550 has been performed (step S8). If locating at the predetermined number of patterns 550 has not been performed (NO in step S8), step S6 and subsequent processes are repeated. If locating at the predetermined number of patterns 550 has been performed (YES in step S8), step S9 and subsequent processes are repeated.

Meanwhile, although a locating destination of the tip 320 of the hand of the robot 300 may be only one pattern 550, in one or some exemplary embodiments, locating is performed with respect to three patterns 550.

The PLC 100 calculates a parameter set with respect to the calibration based on (1) a result of measurement of the positions of patterns 550 displayed on the display of the mobile device 500, (2) a display position of each pattern 550 on the display of the mobile device 500, (3) the position of the tip 320 of the hand detected in the mobile device 500, (4) a result of teaching of the robot 300 (the position of the tip 320 of the hand in the robot coordinate system) and (5) a movement amount of the conveyor 10 (step S9). In addition, the PLC 100 stores the calculated parameter set (step S10). The calibration is completed according to the above-described procedure.

(d2: Calculation of Parameter Set)

Next, the procedure for calculating the parameter set with respect to the calibration shown in step S9 of FIG. 8 will be described in more detail.

Figure 9:
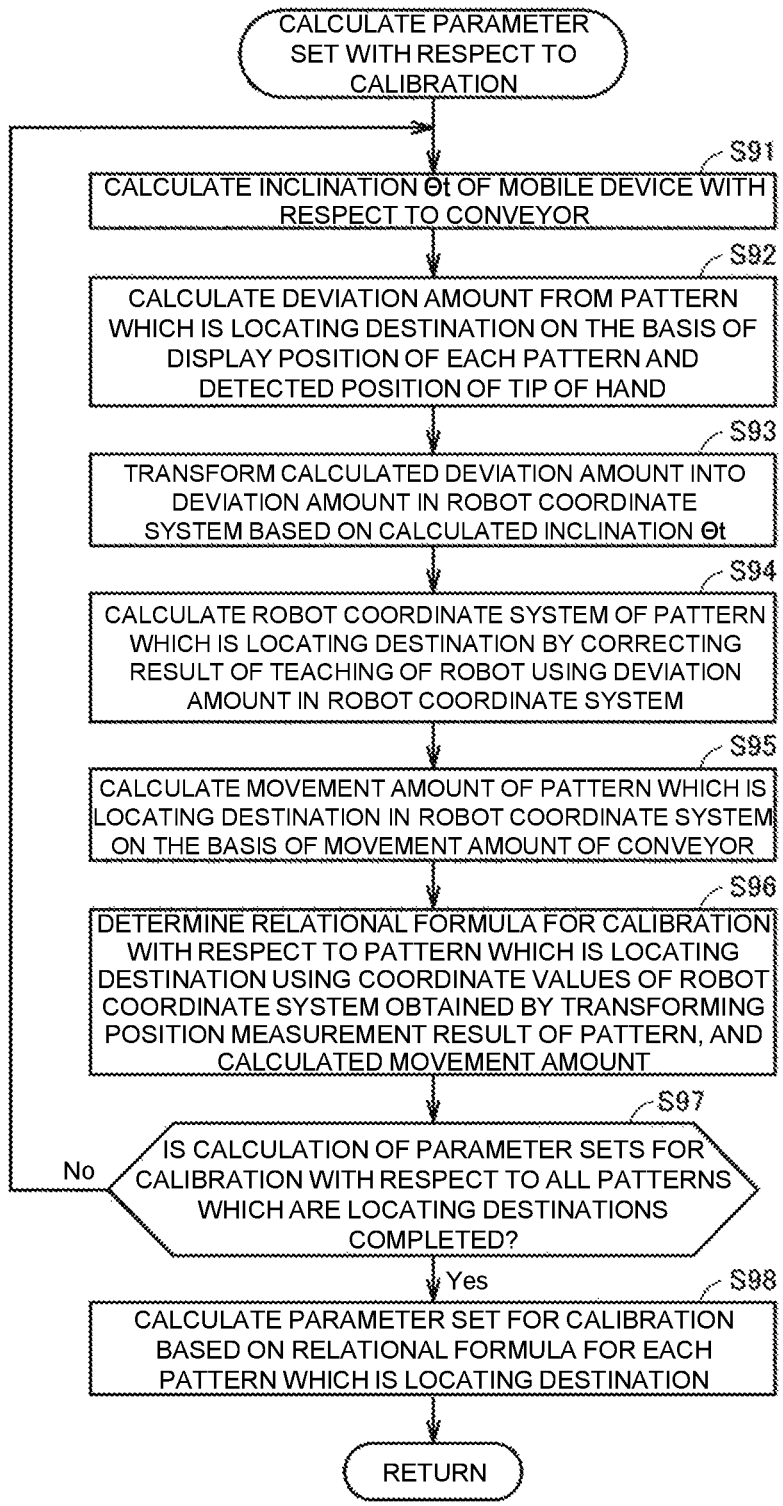
FIG. 9 is a flowchart showing a processing procedure of step S9 of FIG. 8.
Figure 10:
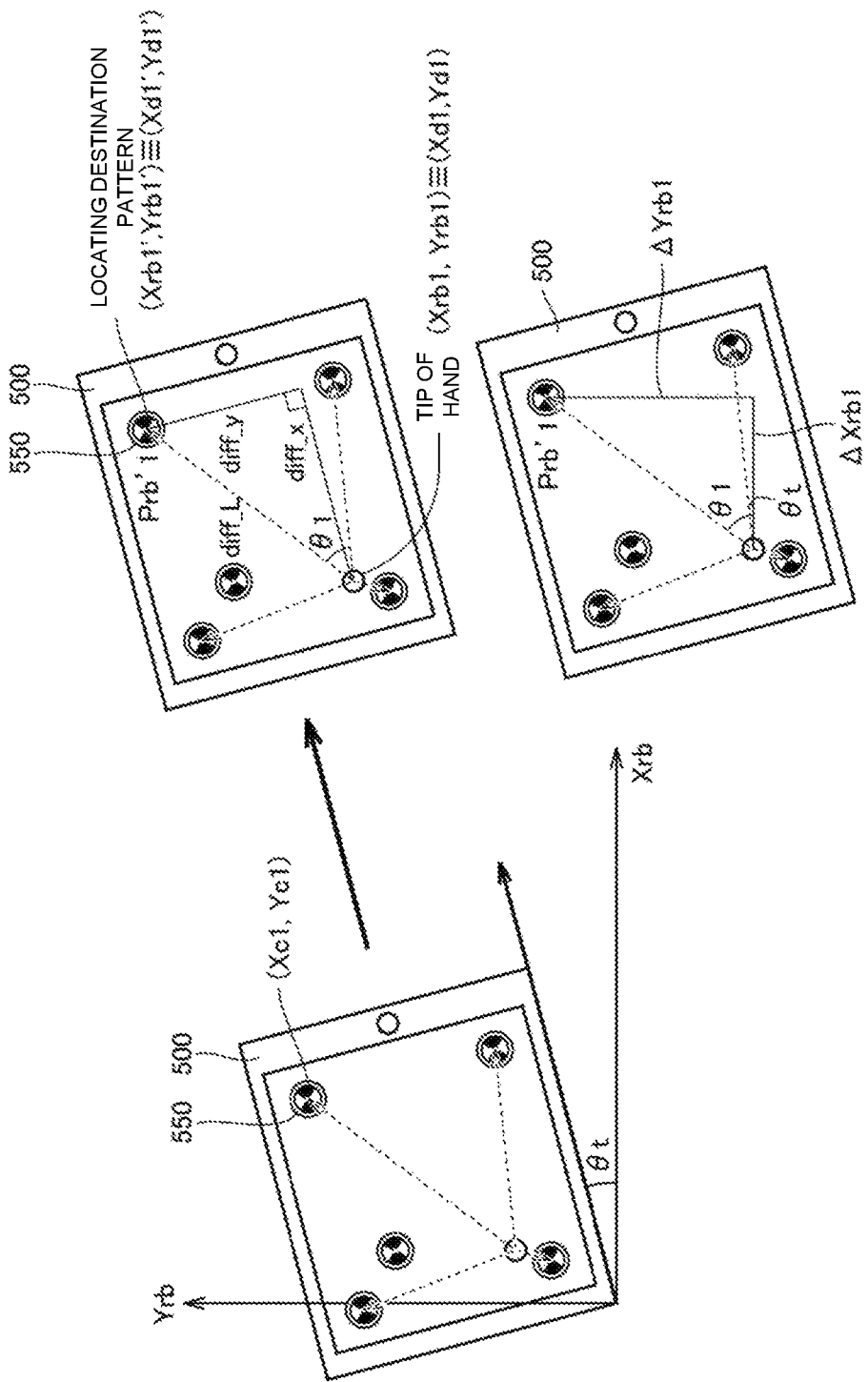
FIG. 10 is a diagram for describing a process of calculating a parameter set according to the calibration shown in FIG. 9.

FIG. 9 is a flowchart showing a processing procedure of step S9 in FIG. 8. FIG. 10 is a diagram for describing the process of calculating the parameter set with respect to the calibration shown in FIG. 9. Each step shown in FIG. 9 is typically realized by the processor 102 of the PLC 100 which executes the calibration program 130 (refer to FIG. 3).

Referring to FIG. 9, the PLC 100 calculates an inclination θt of the mobile device 500 with respect to the conveyor 10 based on (1) a result of measurement of the positions of patterns 550 displayed on the display of the mobile device 500 (step S91). Meanwhile, the inclination θt of the mobile device 500 with respect to the conveyor 10 may be processed by the visual sensor 200. In this case, the PLC 100 acquires the inclination θt of the mobile device 500 with respect to the conveyor 10 from the visual sensor 200.

As shown in FIG. 10, the inclination θt of the mobile device 500 with respect to the conveyor 10 is calculated as an inclination of the mobile device 500 with respect to the conveyor 10 on the basis of positional relationships between patterns 550 measured by capturing an image of the mobile device 500 through the visual sensor 200.

Meanwhile, coordinate values (Xc1, Yc1) of a pattern 550 which is a locating destination in the camera coordinate system is also acquired.

Referring back to FIG. 9, the PLC 100 subsequently calculates a deviation amount from the pattern 550 which is a locating destination based on (2) a display position of each pattern 550 on the display of the mobile device 500 (coordinate values on the display of the mobile device 500 and (3) the position of the tip 320 of the hand detected in the mobile device 500 (coordinate values on the display of the mobile device 500) (step S92). The calculated deviation amount is defined as a difference between coordinate values in the display of the mobile device 500. For a process which will be described later, the deviation amount is defined as a combination of two axial components defined according to a display region of the display of the mobile device 500 (diff_x and diff_y in FIG. 10).

More specifically, since the mobile device 500 knows the positions at which the patterns 550 are displayed on the display and thus may cause the PLC 100 to be aware of coordinate values (Xd1', Yd1') of the pattern 550 which is a locating destination on the display, as shown in FIG. 10. In addition, the mobile device 500 may cause the PLC 100 to be aware of coordinate values (Xd1, Yd1) on the display at which the tip 320 of the hand of the robot 300 touches the mobile device 500.

The PLC 100 calculates a parameter set further based on a deviation amount between one pattern 550 which is a locating destination among the one or more patterns 550 displayed on the mobile device 500 and the touch position.

More specifically, the PLC 100 corrects the deviation amount acquired from the mobile device 500 based on the direction of the mobile device 500 with respect to the conveyor 10 and then calculates the parameter set. Hereinafter, this processing procedure will be represented.

The PLC 100 calculates a deviation amount vector diff_L (diff_x, diff_y) which links the pattern 550 which is a locating destination with the tip 320 of the hand on the basis of the coordinate values (Xd1', Yd1') of the pattern 550 which is a locating destination and the coordinate values (Xd1, Yd1) of the tip 320 of the hand. In addition, the PLC 100 calculates an inclination θ1 (=a tan(diff_y/diff_x)[rad]) of the deviation amount vector diff_L with respect to the display of the mobile device 500.

Referring back to FIG. 9, the PLC 100 transforms the deviation amount calculated in step S92 into a deviation amount in the robot coordinate system based on the inclination θt calculated in step S91 (step S93).

More specifically, as shown in FIG. 10, the PLC 100 calculates a deviation amount vector (ΔXrb1, ΔYrb1 (robot coordinate system)) between the pattern 550 which is a locating destination and the tip 320 of the hand according to relational formulas represented by the following formulas (3-1) and (3-2) using the inclination θt and the inclination θ1.

$$\Delta Xrb1 = k \times \text{diff\_L} \times \cos(\theta t + \theta 1) \quad (3\text{-}1)$$

$$\Delta Yrb1 = k \times \text{diff\_L} \times \sin(\theta t + \theta 1) \quad (3\text{-}2)$$

Here, the coefficient k is a correction coefficient for adapting the magnitudes of pixel values of the display of the mobile device 500 to the magnitude of the robot coordinate system and is acquired in advance based on the size and resolution of the display.

Referring back to FIG. 9, the PLC 100 calculates a robot coordinate system of the pattern 550 which is a locating destination by correcting (4) the result (Xrb1, Yrb1) of teaching of the robot 300 using the deviation amount in the robot coordinate system (step S94). In addition, the PLC 100 (5) calculates a movement amount of the pattern 550 which is a locating destination in the robot coordinate system on the basis of a movement amount of the conveyor 10 (step S95). Then, the PLC 100 (1) determines relational formulas for the calibration with respect to the pattern 550 which is a locating destination using coordinate values of the robot coordinate system which are obtained by transforming the result of measurement of the position of the pattern 550 displayed on the display of the mobile device 500 (coordinate values of the camera coordinate system) and the movement amount calculated in step S95 (step S96). The relational formulas determined in step S96 are represented by the following formulas (4-1) and (4-2) using transformation functions Fx and Fy.

$$\begin{aligned}
Xrb1' &= Fx(Xc1) + dX \cdot Enc \quad (4\text{-}1)\\
&= Xrb1 + k \times \text{diff\_L} \times \cos(\theta t + \theta 1)\\
&= Xrb1 + \Delta Xrb1\\
Yrb1' &= Fx(Yc1) + dY \cdot Enc \quad (4\text{-}2)\\
&= Yrb1 + k \times \text{diff\_L} \times \sin(\theta t + \theta 1)\\
&= Yrb1 + \Delta Yrb1
\end{aligned}$$

Here, Enc denotes a count number counted when the mobile device 500 is moved.

Referring back to FIG. 9, the PLC 100 determines whether the calculation of parameter sets for the calibration with respect to all patterns 550 which are locating destinations is completed (step S97). When there are remaining patterns 550 which are locating designations, for which the calculation of parameter sets for the calibration is not completed (NO in step S97), the PLC 100 repeats step S92 and subsequent processes for other patterns 550 which are locating destinations.

On the other hand, when calculation of parameter sets for the calibration with respect to all patterns 550 which are locating destinations is completed (YES in step S97), the PLC 100 calculates a parameter set for the calibration based on the relational formulas (the aforementioned formulas (4-1) and (4-2)) determined in step S96 for each pattern 550 which is a locating destination (step S98). The calculation of parameter sets is to solve simultaneous linear equations.

According to the above-described process, calculation of parameter sets for the calibration is completed and the process returns to step S10 in FIG. 8.

<E. Calibration Process (2)>

Next, the calibration process (2) will be described. In the calibration process (2), the position of the tip 320 of the hand of the robot 300 is detected by the mobile device 500 first, and then an image of the detected position is captured by the camera 250 to calculate a parameter set for the calibration.

(e1: Overview)

Figure 11:
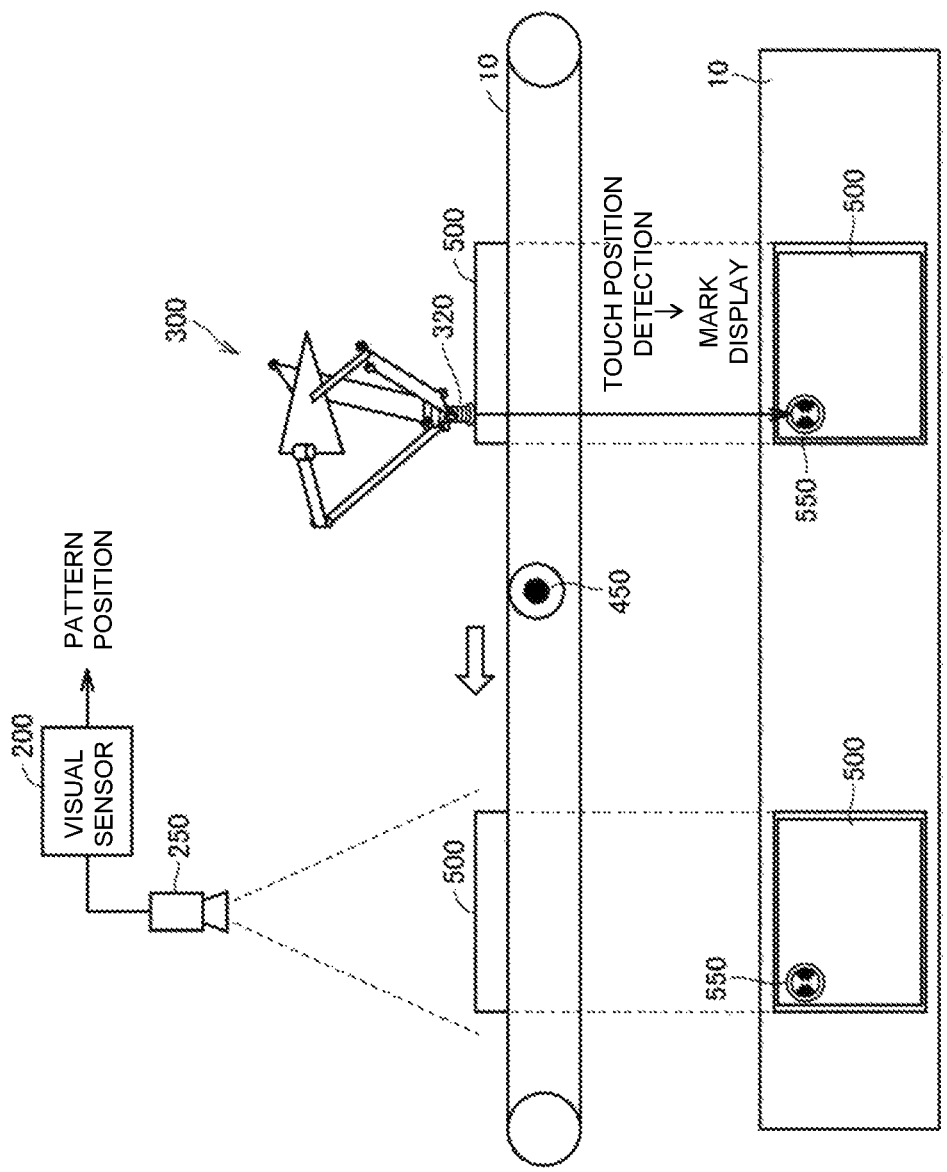
FIG. 11 is a schematic diagram for describing a calibration process (2) according to the present embodiment.
Figure 12:
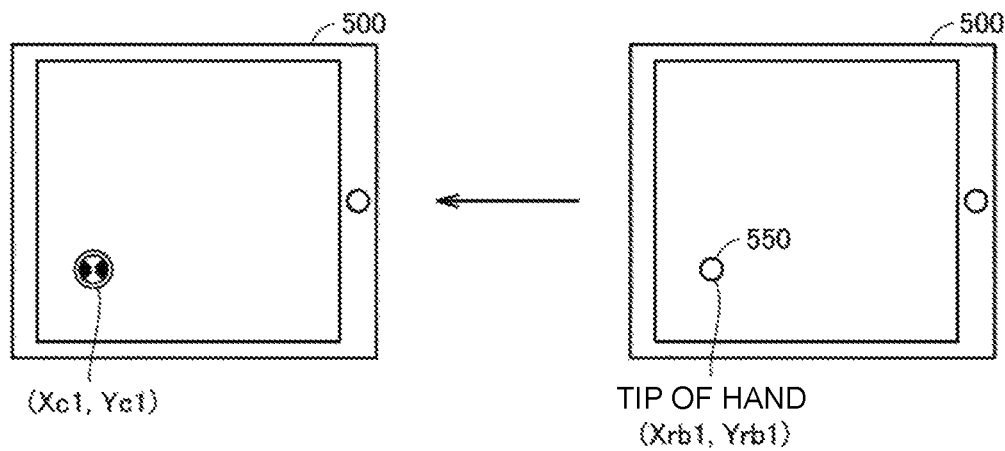
FIG. 12 is a figure showing a processing procedure of the calibration process (2) according to the present embodiment.

FIG. 11 is a schematic diagram for describing the calibration process (2) according to the present embodiment. FIG. 12 is a figure showing a processing procedure of the calibration process (2) according to the present embodiment.

Referring to FIGS. 11 and 12, first, the mobile device 500 is disposed in the tracking range (the operation range of the robot 300) (step S11). Then, the user causes the tip 320 of the hand of the robot 300 to touch any position on the mobile device 500 using the teaching pendant 380 or the like (step S12). The mobile device 500 detects the position at which the tip 320 of the hand of the robot 300 has been located and displays a pattern 550 at the position (step S13).

Thereafter, the conveyor 10 is driven in a reverse direction to convey the mobile device 500 to the imaging visual field of the camera 250 (step S14). Subsequently, the camera 250 captures an image of the mobile device 500 displaying the pattern 550 (step S15) and the visual sensor 200 measures the position (e.g., the position of the center or the position of center of gravity) of the pattern 550 by performing pattern matching or the like on the captured image (step S16).

In this manner, the mobile device 500 displays at least one pattern 550 according to the position touched by the robot 300. In addition, the mobile device 500 receives a touch operation of the robot 300 and then is disposed in the imaging visual field. A parameter set is calculated based on an image measurement result acquired by capturing an image of the mobile device 500 disposed in the imaging visual field using the camera 250.

The PLC 100 calculates a parameter set with respect to the calibration based on (1) a result of measurement of the position of the pattern 550 displayed on the display of the mobile device 500, (2) the position of the tip 320 of the hand detected in the mobile device 500, (3) a result of teaching of the robot 300 (the position of the tip 320 of the hand in the robot coordinate system) and (4) a movement amount of the conveyor 10 (step S17). Then, the PLC 100 stores the calculated parameter set (step S18). The calibration is completed according to the above-described procedure.

(e2: Calculation of Parameter Set)

Next, a procedure for calculating a parameter set with respect to the calibration represented in FIG. 10 will be described in more detail.

Referring to FIG. 11, the mobile device 500 detects a position at which the tip of the hand of the robot 300 touches the touch panel and displays a pattern 550 at the detected position. A result (Xrb1, Yrb1) of teaching of the robot 300 corresponds to the displayed pattern 550.

Thereafter, although the mobile device 500 is moved to the imaging visual field of the camera 250, the movement amount Enc (a count number counted when the mobile device 500 is moved) is known.

In a state in which the mobile device 500 has been disposed in the imaging visual field of the camera 250, the visual sensor 200 may acquire the position (Xc1, Yc1) of the pattern 550 by capturing an image of the mobile device 500.

Finally, the following formulas (5-1) and (5-2) are obtained using the transformation functions Fx and Fy.

$$Fx(Xc1)+dX \cdot Enc=Xrb1 \quad (5\text{-}1)$$

$$Fy(Xc1)+dY \cdot Enc=Yrb1 \quad (5\text{-}2)$$

The PLC 100 calculates a parameter set with respect to the calibration based on the formulas (5-1) and (5-2).

<F. User Interface>

Next, an example of a user interface provided in the mobile device 500 according to the present embodiment will be described.

(f1: Leading to Touch Position)

In the mobile device 500, a pattern 550 to be touched among one or more patterns 550 may be displayed in a different form from other patterns 550.

Figure 13:
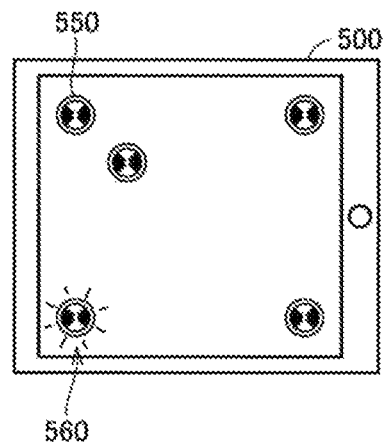
FIG. 13 is a diagram showing an example of a user interface screen provided in a mobile device according to the present embodiment.

FIG. 13 is a diagram showing an example of a user interface screen provided in the mobile device 500 according to the present embodiment. Referring to FIG. 13, the display of the mobile device 500 displays one or more patterns 550 for the calibration. In addition to display of these patterns 550, a pattern 550 at which the tip 320 of the hand of the robot 300 will be located in each stage of the calibration may be displayed in an emphasized manner. That is, an emphasis mark 560 indicating a locating destination is added to a pattern 550 which is a locating destination.

The user locates the tip 320 of the hand of the robot 300 according to the emphasis mark 560. When the tip 320 of the hand of the robot 300 needs to be sequentially located at a plurality of patterns 550, display positions of the emphasis mark 560 are sequentially switched.

Complicatedness of a calibration operation performed by the user can be reduced using the emphasis mark 560 indicating which pattern 550 is desirable to be touched by the tip 320 of the hand of the robot 300. That is, a situation in which the user touches a wrong pattern 550 with the tip 320 of the hand of the robot 300 can be avoided.

Accordingly, a user with little experiment is able to appropriately perform the calibration.

(f2: Checking of Touch Position)

In the mobile device 500, a touch position which is actually touched may be displayed with one or more patterns 550.

Figure 14:
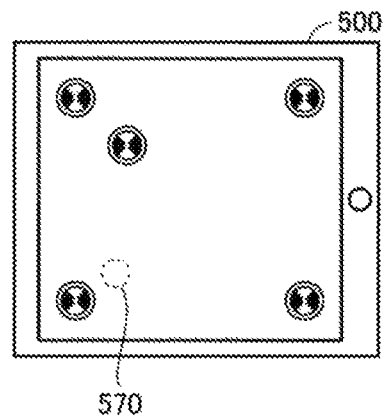
FIG. 14 is a diagram showing another example of a user interface screen provided in the mobile device according to the present embodiment.

FIG. 14 is a diagram showing another example of a user interface screen provided in the mobile device 500 according to the present embodiment. Referring to FIG. 14, the display of the mobile device 500 displays one or more patterns 550 for the calibration. In addition to these patterns 550, a touch position mark 570 indicating a position at which the tip 320 of the hand of the robot 300 is located and the mobile device 500 detects a touch of the tip 320 of the hand may be provided.

Although FIG. 14 exemplifies the circular touch position mark 570 as an example, any shape such as a dot, an oval, a polygon, an asterisk and a circular slit may be used. In addition, any color may be employed as a display color of the touch position mark 570 and flickering or change of a display color may be employed in order to improve visibility.

The user is able to check whether the tip 320 of the hand of the robot 300 has been correctly located at a pattern 550 which is a locating destination by locating the tip 320 of the hand of the robot 300 and then referring to the touch position mark 570. In addition, the user is able to find out a habit or disposition of the robot 300 by recognizing a difference between the pattern 550 which is a locating destination and the touch position mark 570 which is an actually touched position and thus can improve the skill of operating the robot 300 for the calibration.

(f3: Display of Calibration Accuracy)

In the calibration according to the present embodiment, the calibration accuracy may be calculated based on a deviation from a regression equation in a parameter set calculation process. Typically, the calibration accuracy is calculated in the PLC 100. The calibration accuracy calculated in the PLC 100 may be transmitted to the mobile device 500. When such a configuration is employed, the user may be notified of the calibration accuracy through the mobile device 500.

That is, the mobile device 500 may display the accuracy of a parameter set calculated by the PLC 100.

In the conveyor tracking system 1 according to the present embodiment, a touch position detected by the mobile device 500 is transmitted to the PLC 100 according to wireless communication or the like. In addition, a parameter set with respect to the calibration is calculated in the PLC 100 and the calibration accuracy of the calculated calibration is also calculated. Further, the calculated calibration accuracy is returned to the mobile device 500 and thus the user is able to immediately check a calibration operation result. If it is determined that sufficient calibration accuracy has not been acquired, the user is able to immediately resume the calibration operation.

Figure 15:
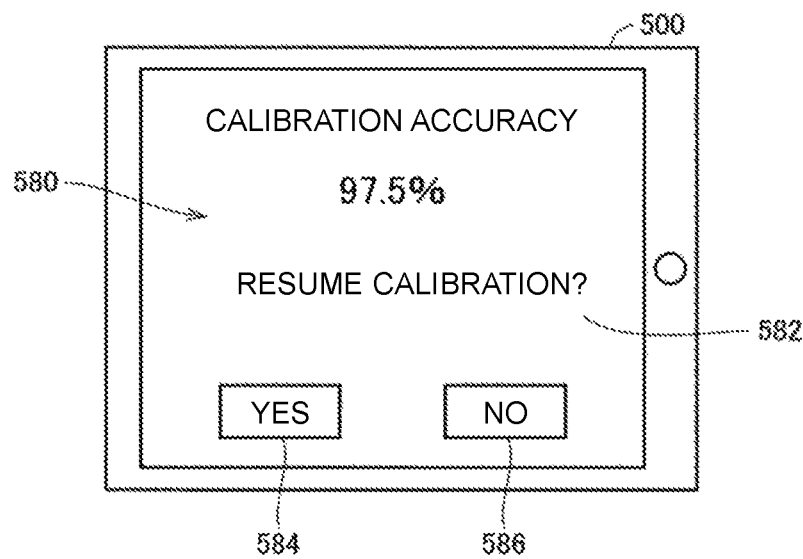
FIG. 15 is a diagram showing yet another example of a user interface screen provided in the mobile device according to the present embodiment.

FIG. 15 is a diagram showing yet another example of a user interface screen provided in the mobile device 500 according to the present embodiment. Referring to FIG. 15, the display of the mobile device 500 displays a numerical value of the calibration accuracy received from the PLC 100 (numerical value indication 580) and also displays a message 582 for asking resumption of the calibration.

For the message 582, the user selects a "YES" button 584 if the calibration is resumed and selects a "NO" button 586 if not.

Alternatively, when the calibration accuracy does not reach a predetermined value, the intent of resumption of the calibration may be indicated to the user.

As described above, according to the mobile device 500 according to the present embodiment, when a calibration operation is performed, the calibration accuracy can be immediately checked and thus it is possible to reliably determine whether the calibration has been appropriately performed. In addition, the user can think of the cause when the calibration has been appropriately performed and thus can improve the skill of operating the robot 300 for the calibration.

(f4: Support of Robot Operation)

In the conveyor tracking system 1 according to the present embodiment, since a difference between the position of a displayed pattern 550 and a position actually touched by the tip 320 of the hand can be calculated in the mobile device 500, a habit or disposition of the user performing a calibration operation may be acquired on the basis of the calculated difference. A method of operating the robot 300 may be supported for the user according to such habit or disposition of the user.

Figure 16:
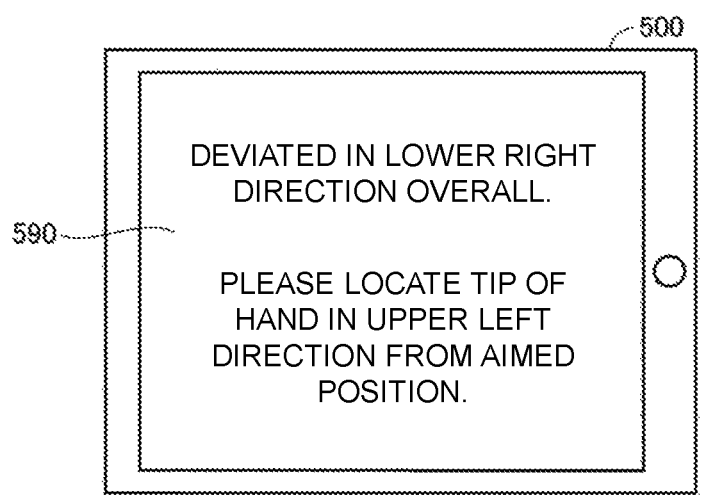
FIG. 16 is a diagram showing yet another example of a user interface screen provided in the mobile device according to the present embodiment.

FIG. 16 is a diagram showing yet another example of a user interface screen provided in the mobile device 500 according to the present embodiment. Referring to FIG. 16, the display of the mobile device 500 may display details of an acquired habit or disposition of the user with respect to a calibration operation and a support message 590 including a guidance according to the habit or disposition, for example.

Specifically, the support message 590 presents a disposition of a user operation and a skill of the user to operate the tip 320 of the hand of the robot 300. By presenting the support message 590 to the user, the user is able to locate the tip 320 of the hand of the robot 300 more appropriately when the user resumes the calibration, for example. It is possible to improve the skill of operating the robot 300 for the calibration by presenting the support message 590 to the user.

<G. Supplementary Notes>

The present embodiment described above includes the following technical ideas.

[Configuration 1]

A conveyor tracking system including a conveyance device 10 which conveys workpieces W;

a robot 300 which is disposed in association with the conveyance device and picks up the workpieces conveyed by the conveyance device;

an image capturing part 250 which has an imaging visual field on a conveyance route of the conveyance device;

a visual sensor 200 which performs an image measurement on images captured by the image capturing part;

a control device 100 which generates an operation command for the robot using a previously calculated parameter set based on an image measurement result obtained by the visual sensor; and a mobile device 500 which has a touch panel 520 used in a process of calculating the parameter set, wherein the mobile device includes:

a display part 520 which displays one or a plurality of patterns 550 at predetermined positions; and a transmission part 516 which transmits, according to a fact of being touched in a state in which the one or the plurality of the patterns is displayed, information indicating a touch position being touched to the control device, and the control device includes a calculation part 130 which calculates the parameter set based on the image measurement result obtained by the visual sensor when the mobile device is disposed in the imaging visual field in a state in which the one or the plurality of the patterns is displayed, the touch position when the mobile device is touched by the robot, and a distance between a position of the mobile device when the mobile device is disposed in the imaging visual field and a position when the mobile device is touched by the robot.

[Configuration 2]

The conveyor tracking system disclosed in configuration 1, wherein, after the mobile device is disposed in the imaging visual field and is captured by the imaging capturing part, the mobile device receives a touch operation performed by the robot.

[Configuration 3]

The conveyor tracking system disclosed in configuration 1 or 2, wherein the control device calculates the parameter set further based on the a deviation amount between one of the one or the plurality of the patterns displayed on the mobile device and the touch position.

[Configuration 4]

The conveyor tracking system disclosed in configuration 3, wherein the control device corrects the deviation amount based on a direction of the mobile device with respect to the conveyance and then calculates the parameter set.

[Configuration 5]

The conveyor tracking system disclosed in configuration 1, wherein the mobile device displays at least one pattern according to the touch position touched by the robot and is disposed in the imaging visual field after receiving a touch operation performed by the robot.

[Configuration 6]

The conveyor tracking system disclosed any one of configurations 1 to 5, wherein the mobile device displays a pattern to be touched among the one or the plurality of the patterns in a different form 560 from other patterns.

[Configuration 7]

The conveyor tracking system disclosed any one of configurations 1 to 6, wherein the mobile device displays the touch position 570 along with the one pattern or the plurality of the patterns.

[Configuration 8]

The conveyor tracking system disclosed any one of configurations 1 to 7, wherein the mobile device displays an accuracy 580 of the parameter set calculated by the control device.

[Configuration 9]

The conveyor tracking system disclosed any one of configurations 1 to 8, wherein data is exchanged between the control device and the mobile device through wireless communication.

[Configuration 10]

A calibration method in a conveyor tracking system 1 including a conveyance device 10 which conveys workpieces W; a robot 300 which is disposed in association with the conveyance device and picks up the workpieces conveyed by the conveyance device; an image capturing part 250 which has an imaging visual field on a conveyance route of the conveyance device; a visual sensor 200 which performs an image measurement on images captured by the image capturing part; and a control device 100 which generates an operation command for the robot using a previously calculated parameter set based on an image measurement result obtained by the visual sensor, the calibration method including:

displaying one or a plurality of patterns at predetermined positions on a display of a mobile device having a touch panel (S1);

disposing the mobile device in the imaging visual field in a state in which the one or the plurality of the patterns are displayed on the display of the mobile device and acquiring the image measurement result with respect to an image obtained by capturing an image of the mobile device according to the visual sensor (S2 to S4);

acquiring a touch position when the mobile device is touched by the robot in a state in which the one or the plurality of the patterns are displayed on the display of the mobile device (S5 to S7); and calculating the parameter set based on the image measurement result, the touch position and a distance between a position of the mobile device in a state in which the mobile device is disposed in the imaging visual field and a position when the mobile device is touched by the robot (S9).

<H. Other Configurations>

According to one embodiment of the disclosure, a conveyor tracking system is provided. The conveyor tracking system includes a conveyance device that conveys workpieces; a robot that is disposed in association with the conveyance device and picks up the workpieces conveyed by the conveyance device; an image capturing part that has an imaging visual field on a conveyance route of the conveyance device; a visual sensor that performs an image measurement on images captured by the image capturing part; a control device that generates an operation command for the robot using a parameter set that is previously calculated based on an image measurement result obtained by the visual sensor; and a mobile device which has a touch panel used for a process of calculating the parameter set. The mobile device includes a display part which displays one or more patterns at predetermined positions; and a transmission part which transmits, according to a fact of being touched in a state in which the one or more patterns are displayed, information indicating a touch position being touched to the control device. The control device includes a calculation part which calculates that parameter set based on the image measurement result obtained by the visual sensor when the mobile device is disposed in the imaging visual field in a state in which the one or more patterns are displayed, the touch position when the mobile device is touched by the robot, and a distance between a position of the mobile device when the mobile device is disposed in the imaging visual field and a position when the mobile device is touched by the robot.

According to this embodiment of the disclosure, since positions at which one or a plurality of patterns is displayed and a touch position actually touched by the robot may be detected in the mobile device, it is possible to correct a position deviation therebetween and then calculate a parameter set for calibration even when a user has a low operation skill.

In the above-described embodiment of the disclosure, after the mobile device is disposed in the imaging visual field and captured by the imaging capturing part, the mobile device may receive a touch operation performed by the robot.

According to this embodiment of the disclosure, it is possible to calculate a parameter set for calibration by conveying the mobile device instead of workpieces in the conveyance device.

In the above-described embodiment of the disclosure, the control device may calculate the parameter set further based on a deviation amount between one of the one or the plurality of the patterns displayed on the mobile device and the touch position.

According to this embodiment of the disclosure, a user having a low operation skill can also realize calibration with little error.

In the above-described embodiment of the disclosure, the control device may correct the deviation amount based on a direction of the mobile device with respect to the conveyance device and then calculate a parameter set.

According to this embodiment of the disclosure, it is possible to appropriately calculate a parameter set even when the mobile device is disposed being inclined with respect to the conveyance device.

In the above-described embodiment of the disclosure, the mobile device may display at least one pattern according to the touch position touched by the robot and may be disposed in the imaging visual field after receiving a touch operation of the robot.

According to this embodiment of the disclosure, since a pattern may be displayed at a position according to a touch position, a deviation amount between the pattern and the touch position is not generated and thus a calibration error can be reduced.

In the above-described embodiment of the disclosure, the mobile device displays a pattern to be touched among the one or the plurality of the patterns in a different form from other patterns.

According to this embodiment of the disclosure, a user with little experience can also realize calibration without an operation mistake.

In the above-described embodiment of the disclosure, the mobile device may display the touch position along with the one or the plurality of the patterns.

According to this embodiment of the disclosure, since a user may check the position of the mobile device touched by actually operating the robot, the user can objectively ascertain the accuracy of operation thereof and the like and thus can improve in operation skill.

In the above-described embodiment of the disclosure, the mobile device may display an accuracy of the parameter set calculated by the control device.

According to this embodiment of the disclosure, after a parameter set for calibration is calculated, the user can recognize the accuracy of the calculated parameter and thus can objectively ascertain a necessity of resumption of calibration.

In the above-described embodiment of the disclosure, data may be exchanged between the control device and the mobile device through wireless communication.

According to this embodiment of the disclosure, a series of calibration processes can be concluded in a state in which the mobile device has been disposed on the conveyance device.

According to another embodiment of the disclosure, a calibration method in a conveyor tracking system is provided. The conveyor tracking system includes a conveyance device which conveys workpieces; a robot which is disposed in association with the conveyance device and picks up the workpieces conveyed by the conveyance device; an image capturing part which has an imaging visual field on a conveyance route of the conveyance device; a visual sensor which performs an image measurement on images captured by the image capturing part; and a control device which generates an operation command for the robot using a parameter set that is previously calculated, based on the an image measurement result obtained by the visual sensor. The calibration method includes displaying one or a plurality of patterns at predetermined positions on a display of a mobile device having a touch panel; disposing the mobile device in the imaging visual field in a state in which the one or the plurality of the patterns is displayed on the display of the mobile device and acquiring the image measurement result with respect to an image obtained by capturing an image of the mobile device according to the visual sensor; acquiring a touch position when the mobile device is touched by the robot in a state in which the one or the plurality of the patterns is displayed on the display of the mobile device; and calculating the parameter set based on the image measurement result, the touch position and a distance between a position of the mobile device in a state in which the mobile device is disposed in the imaging visual field and a position when the mobile device is touched by the robot.

According to this embodiment of the disclosure, since positions at which one or a plurality of patterns is displayed and a touch position actually touched by the robot may be detected in the mobile device, it is possible to correct a position deviation therebetween and then calculate a parameter set for calibration even when a user has a low operation skill.

According to the embodiments of the disclosure, it is possible to provide a method by which even a user with little experience in robot operation is able to perform correct calibration.

<I. Conclusion>

In operation of conveyor tracking according to the present embodiment, a parameter set is calculated for performing transformation between the camera coordinate system and the robot coordinate system according to calibration.

In a conventional calibration method, a sheet including patterns for calibration is disposed on a conveyor and an image thereof is captured using a camera to acquire the positions of center of gravity of the patterns as coordinate values of the camera coordinate system. Then, the conveyor is operated to move the patterns for calibration to a position at which a robot picks up workpieces. In addition, the tip of the hand of the robot is located at the position of center of gravity of each pattern for calibration to teach the position (coordinate values of the robot coordinate system). Finally, the parameter set is calculated based on the coordinate values (a measurement result obtained by the camera) of the camera coordinate system, the coordinate values (a result of teaching of the robot) of the robot coordinate system, and a movement distance of the conveyor. Here, teaching of the robot requires at least three points.

In the above-described conventional method, a coordinate transformation formula includes an error if a robot teaching position is not correctly aligned with a pattern for calibration. When a command for performing a pickup operation is generated using the coordinate transformation formula including such an error, the robot fails to adsorb and grip the workpieces.

On the contrary, in the present embodiment, the position of center of gravity of each pattern is acquired by capturing an image of the mobile device 500 using the camera in a state in which patterns for calibration are displayed on the display of the mobile device 500 by using the mobile device 500 having the touch panel.

In addition, the mobile device 500 is touched with the tip 320 of the hand of the robot 300 to acquire a teaching position at that time and the positions of patterns for calibration displayed on the display of the mobile device 500. Such information acquired by the mobile device 500 is transmitted to the PLC 100 such that the PLC 100 calculates a parameter set for calibration.

According to the present embodiment, since information of a teaching position for the robot 300 (coordinate values of the robot coordinate system) and coordinate values actually detected by the mobile device 500 at that time can be acquired, an error in the teaching position can be corrected. Accordingly, calibration accuracy can be improved compared to cases in which the conventional sheet including patterns for calibration is used.

Furthermore, according to the present embodiment, restrictions that the robot needs to be taught at three points or more, which are required in the conventional method, can be mitigated. Accordingly, a time required for calibration can be reduced.

In the present embodiment, an actually touched position, calibration accuracy of a calculated parameter set, and the like can be displayed on the mobile device 500, and thus user operability with respect to calibration can be improved.

The embodiments disclosed herein are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A conveyor tracking system, comprising:
a conveyance device, conveying workpieces;
a robot, disposed in association with the conveyance device and picking up the workpieces conveyed by the conveyance device;
an image capturing part, having an imaging visual field on a conveyance route of the conveyance device;
a visual sensor, performing an image measurement on images captured by the image capturing part;
a control device, generating an operation command for the robot using a parameter set that is previously calculated based on an image measurement result obtained by the visual sensor; and
a mobile device, having a touch panel used in a calculation process of the parameter set, wherein the mobile device comprises a display part and a transmission part, the display part displays one or a plurality of patterns at predetermined positions, and the transmission part transmits, according to a fact of being touched in a state that the one or the plurality of the patterns is displayed, information that indicates a touch position being touched to the control device,
wherein the control device comprises a calculation part that calculates the parameter set for a calibration between a camera coordinate system and a robot coordinate system based on the image measurement result obtained by the visual sensor when the mobile device is disposed in the imaging visual field in a state that the one or the plurality of the patterns are displayed, the touch position when the mobile device is touched by the robot, and a distance between a position of the mobile device when the mobile device is disposed in the imaging visual field and a position when the mobile device is touched by the robot,
wherein the control device calculates the parameter set further based on a deviation amount between the touch position and one of the plurality of the patterns displayed on the mobile device or between the touch position and the plurality of the patterns displayed on the mobile device,
wherein the deviation amount is obtained using an inclination of the touch panel of the mobile device with respect to the conveyance device and an inclination of the touch panel of the mobile device with respect to a vector which links the touch position with the one of the plurality of the patterns displayed on the mobile device.

2. The conveyor tracking system according to claim 1, wherein after the mobile device is disposed in the imaging visual field and an image of the mobile device is captured by the imaging capturing part, the mobile device receives a touch operation performed by the robot.

3. The conveyor tracking system according to claim 1, wherein the control device corrects the deviation amount based on a direction of the mobile device with respect to the conveyance device and then calculates the parameter set.

4. The conveyor tracking system according to claim 1, wherein the mobile device displays at least one pattern according to the touch position touched by the robot and is disposed in the imaging visual field after receiving a touch operation performed by the robot.

5. The conveyor tracking system according to claim 1, wherein the mobile device displays a pattern to be touched among the one or the plurality of the patterns in a different form from other patterns.

6. The conveyor tracking system according to claim 1, wherein the mobile device displays the touch position along with the one or the plurality of the patterns.

7. The conveyor tracking system according to claim 1, wherein the mobile device displays an accuracy of the parameter set calculated by the control device.

8. The conveyor tracking system according claim 1, wherein data is exchanged between the control device and the mobile device through wireless communication.

9. A calibration method in a conveyor tracking system, wherein the conveyor tracking system includes:
a conveyance device that conveys workpieces;
a robot that is disposed in association with the conveyance device and picks up the workpieces conveyed by the conveyance device;
an image capturing part that has an imaging visual field on a conveyance route of the conveyance device;
a visual sensor that performs an image measurement on images captured by the image capturing part; and
a control device that generates an operation command for the robot using a parameter set that is previously calculated based on an image measurement result obtained by the visual sensor,
wherein the calibration method comprises:
displaying one or a plurality of patterns at predetermined positions on a display of a mobile device having a touch panel;
disposing the mobile device in the imaging visual field in a state in which the one or the plurality of the patterns are displayed on the display of the mobile device and acquiring the image measurement result with respect to an image obtained by capturing an image of the mobile device by a camera;
acquiring a touch position when the mobile device is touched by the robot in a state in which the one or the plurality of the patterns is displayed on the display of the mobile device; and
calculating the parameter set for a calibration between a camera coordinate system and a robot coordinate system based on the image measurement result, the touch position and a distance between a position of the mobile device in a state in which the mobile device is disposed in the imaging visual field and a position when the mobile device is touched by the robot;
  wherein the control device calculates the parameter set further based on a deviation amount between the touch position and one of the plurality of the patterns displayed on the mobile device OR between the touch position and the plurality of the patterns displayed on the mobile device,
  wherein the deviation amount is obtained using an inclination of the touch panel of the mobile device with respect to the conveyance device and an inclination of the touch panel of the mobile device with respect to a vector which links the touch position with the one of the plurality of the patterns displayed on the mobile device.

* * * * *